United States Patent [19]

Minto

[11] Patent Number: 5,555,220
[45] Date of Patent: Sep. 10, 1996

[54] SLICKLINE CONVEYED WELLBORE SEISMIC RECEIVER

[75] Inventor: James Minto, Houston, Tex.

[73] Assignee: Western Atlas International, Inc., Houston, Tex.

[21] Appl. No.: 529,414

[22] Filed: Sep. 18, 1995

Related U.S. Application Data

[63] Continuation of Ser. No. 267,566, Jun. 28, 1994, abandoned.

[51] Int. Cl.$^6$ .................................................. G01V 1/40
[52] U.S. Cl. ...................... 367/86; 367/911; 340/853.9; 166/250.01; 175/50; 73/152.58
[58] Field of Search .................................. 367/57, 86, 40, 367/15, 911, 912, 55; 181/108, 102; 166/250.01; 175/40, 41, 45, 50; 340/853.9; 73/152

[56] References Cited

U.S. PATENT DOCUMENTS

| | | | |
|---|---|---|---|
| 3,972,019 | 7/1976 | Bassett | 367/55 |
| 4,216,536 | 8/1980 | More | 367/83 |
| 4,627,036 | 12/1986 | Wyatt | 367/57 |
| 4,694,166 | 9/1987 | Gearhart | 250/261 |
| 4,894,807 | 1/1990 | Alam et al. | 367/15 |
| 4,901,289 | 2/1990 | Cretin et al. | 367/34 |
| 5,062,084 | 10/1991 | Schoepf et al. | 367/13 |
| 5,130,705 | 7/1992 | Allen et al. | 340/853.9 |
| 5,130,950 | 7/1992 | Orban et al. | 367/34 |
| 5,253,223 | 10/1993 | Suenning et al. | 367/178 |
| 5,515,039 | 5/1996 | Delattore | 340/854.9 |

FOREIGN PATENT DOCUMENTS

| | | | |
|---|---|---|---|
| 2029016 | 3/1980 | United Kingdom | 367/57 |

OTHER PUBLICATIONS

Vertical Seismic Profiling, Hardage, Bob A., Geophysical Press Limited, London, 1985, pp. 1–11.
Abnormal Formation Pressures, Elsevier Science B.V., Amsterdam, 1994, pp. 172–179 (T. K. Kan and C. J. Sicking).

Primary Examiner—Michael J. Carone
Assistant Examiner—Christopher K. Montgomery
Attorney, Agent, or Firm—Richard A. Fagin

[57] ABSTRACT

The invention is a system for conducting a geophysical survey in a wellbore, comprising a battery-powered, self-contained borehole seismic receiver which internally digitizes and records an electrical signal generated by a transducer in the receiver, and a surface control unit which records the acoustic signature of the seismic energy source deployed at the earth's surface, controls the firing of the seismic source, and correlates the recording in the receiver to the recording of the source to determine the travel time of the seismic energy through the earth.

11 Claims, 4 Drawing Sheets

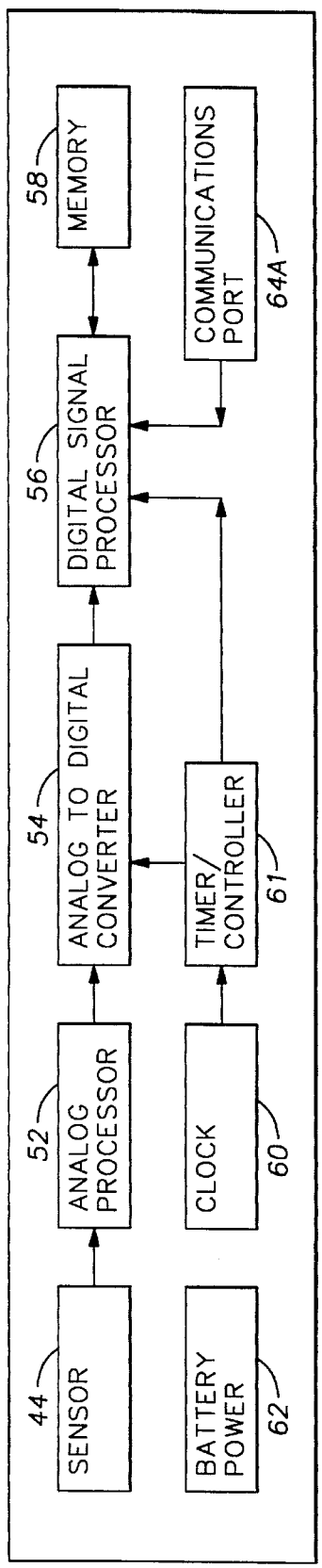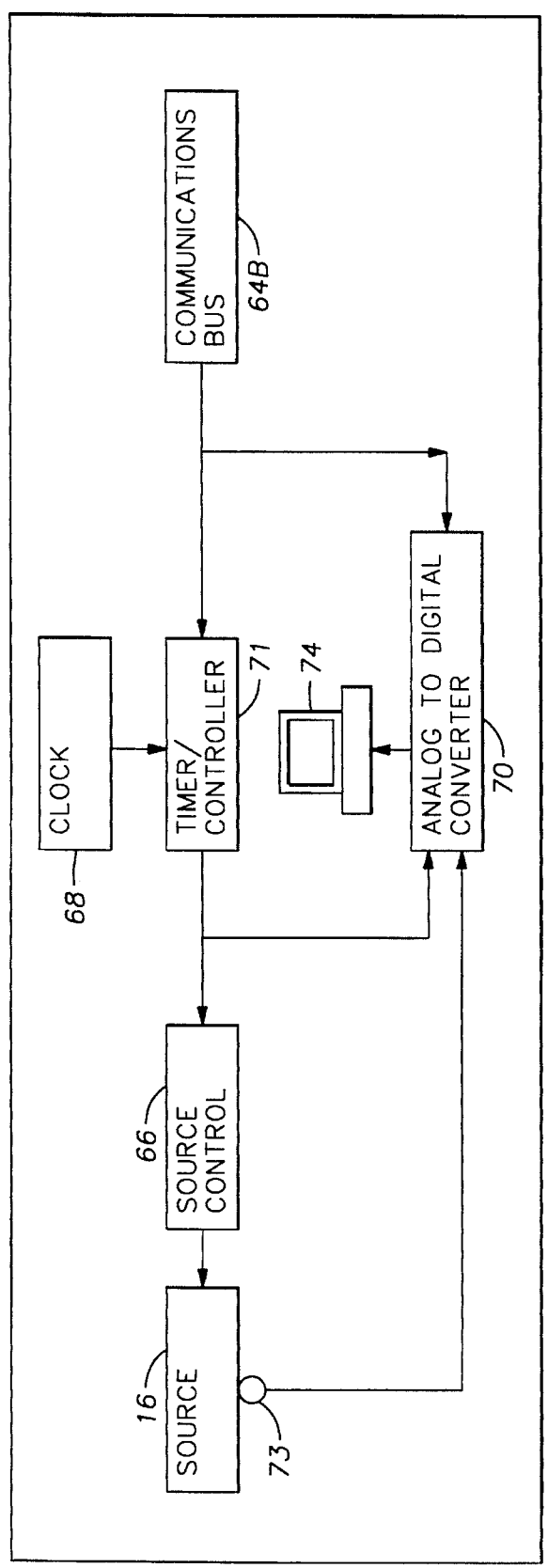

SLICKLINE CONVEYED WELLBORE SEISMIC RECEIVER

This is a continuation of application Ser. No. 08/267,566 filed Jun. 28, 1994 now abandoned.

BACKGROUND OF THE INVENTION

1. Field of the Invention

The present invention is related to the field of geophysical exploration. More specifically, the present invention is related to the use of a seismic receiver in a wellbore, in particular for conducting a seismic survey while the wellbore is being drilled.

2. Discussion of the Related Art

A seismic receiver typically is deployed in a wellbore for determining the response of the earth to seismic energy in the vicinity of the wellbore, which enables determination of certain characteristics of the earth in the vicinity of the wellbore such as geological structure, and the location of changes in the material properties of the earth which may naturally occur.

The various uses of a seismic receiver deployed in a wellbore, also known as a borehole seismic receiver, are known in the art. For example, "Vertical Seismic Profiling", by Bob A. Hardage, Geophysical Press, London, 1985, describes typical applications for the use of a borehole seismic receiver.

One of the reasons for using a borehole seismic receiver is for matching various depths within the earth penetrated by the wellbore to specific travel times of seismic energy generated at the earth's surface. In relatively unexplored areas, geophysical surveys are typically conducted entirely at the earth's surface. Being able to determine the time for seismic energy to travel to a particular depth within the earth, using a surface seismic survey, depends on a portion of the seismic energy generated at the earth's surface for the survey being reflected from a zone in the earth having an acoustic impedance mismatch. Impedance mismatches, known as reflectors, typically occur at boundaries of changes in material composition or material properties of the earth. Reflectors are of particular interest for identifying possible exploration targets within the earth. In order to calculate the depth to a particular exploration target in the earth, where the seismic travel time is determined by the presence of a reflector in the surface seismic survey, it is necessary to determine the velocity of the seismic energy through the earth. The velocity of the seismic energy through the earth is strongly related to the composition and material properties of the earth. The material properties of the earth may vary widely within different earth formations within the depth range traversed by the wellbore.

It is not possible to explicitly determine velocity of the formations solely from the surface seismic survey, therefore, when a wellbore is drilled in a relatively unexplored area, a borehole seismic receiver is typically used to make measurements which are used to determine the velocity of the seismic energy within the earth.

Determining the velocity of the formations while the wellbore is being drilled, rather than after the drilling is completed, can be particularly valuable in certain instances. For example, some wellbores are drilled directionally to the exploration target because the target is located at a horizontally displaced location from the location of the wellbore at the earth's surface. If the target has been selected only on the basis of seismic travel time to a reflector, then the depth to the target may not be precisely determinable without knowledge of the velocity of the formations from the earth's surface to the depth of the target. This could cause the planned wellbore trajectory to miss the target entirely. Periodic use of a wellbore seismic receiver during drilling, in conjunction with a seismic energy source deployed at the earth's surface directly above the position of the wellbore seismic receiver, enables measurement of seismic energy travel time to the depth of the seismic receiver deployed in the wellbore. The measurement of seismic travel times to various depths enables calibration of the surface seismic survey travel time in depth, thereby increasing the probability that the target will be penetrated by the wellbore.

Certain reflectors observed on the surface seismic survey are of particular concern in drilling the wellbore. For example, "Abnormal Formation Pressure", by Walter Fertl, Elsevier Publishing, Amsterdam, 1976, describes reflectors which sometimes correlate to the presence of significant changes in the gradient of fluid pressure contained within some formations. Knowledge of the precise depth of the reflector could prevent drilling problems which might result from an unintended penetration by the wellbore of a formation containing fluid pressure with a significantly different gradient than the gradient otherwise expected in the vicinity of the wellbore. The use of a borehole seismic receiver to calibrate seismic travel time to the wellbore depth could enable more precise determination of the depth of the reflector, which could prevent unintended penetration of the formation having abnormal fluid pressure.

It is also known in the art to use borehole seismic receivers for generating seismic reflection sections in an area within about 1000 feet around the wellbore. Seismic energy from the seismic energy source also travels deeper than the receiver in the wellbore, and the seismic energy can be reflected by zones having acoustic impedance mismatch, just as with a surface seismic section. The reflection energy can be identified by appropriate processing of a recording of the energy detected by the receiver. The identified reflection energy can be displayed in a form for comparing the borehole seismic survey with the surface seismic survey.

It is difficult to use the borehole seismic receivers known in the art, while the wellbore is being drilled. Each time the borehole seismic receiver is to be run in the wellbore, drilling the wellbore must stop, and a drillpipe, which is used to operate a drilling bit, must be removed from the wellbore. The drillpipe is formed from sections each having a length of thirty to ninety feet. The sections are joined by threaded connections which must be uncoupled each time the drillpipe is removed from the wellbore. Further, the borehole seismic receiver must be run in the wellbore on an electrical cable, or wireline, and a clamping mechanism, which forms part of the borehole seismic receiver and forces the receiver into contact with the wellbore wall, is deployed to enable good acoustic coupling from the wellbore wall to the borehole seismic receiver. There is a significant risk of the borehole seismic receiver becoming stuck in the wellbore. Retrieving the borehole seismic receiver when it is stuck in the wellbore is particularly difficult because the wireline obstructs the process of retrieval of objects stuck in the wellbore.

It is an object of the present invention to provide a borehole seismic receiver which can be deployed in a wellbore without removing the drillpipe from the wellbore.

It is a further object of the present invention to provide a borehole seismic receiver which can be deployed without the use of an electric wireline.

SUMMARY OF THE INVENTION

The present invention is a system for recording a borehole seismic survey comprising a borehole seismic receiver which is operated without electrical connection to a surface control unit during the recording of a VSP or borehole seismic survey. The receiver comprises a housing containing: an acoustic transducer; a signal digitizing, time marking, recording unit; and a self-contained electric power source. The system also comprises a surface control unit which has: a timer-controller; a source controller; a near-field sensor; and a computer. The timer-controller activates the source controller to activate a seismic energy source at predetermined intervals corresponding to the time intervals at which the receiver is programmed to digitize signals from the transducer. The near-field sensor detects the seismic energy emitted by the source, and sends a signal to the computer. The signal represents the acoustic signature of the source. When the receiver is brought to the surface, the memory in the receiver is read by the computer, and the signal recording is correlated to the seismic energy source signature recording stored in the computer. A travel time of seismic energy through the earth to the receiver is then determined.

The present invention is also a method of recording a borehole seismic survey in which the seismic receiver is deployed in the wellbore without being connected to the surface control unit. After the receiver is deployed, a seismic energy source is activated and the survey is recorded. The receiver is then retrieved from the wellbore and the recording unit is coupled to the surface control unit, which comprises a computer, wherein the time marked, digitized recordings of acoustic signal are transferred to the computer, and the digitized survey recordings are reconstructed into a record of acoustic amplitude scaled in time relative to the time of activation of the seismic energy source.

BRIEF DESCRIPTION OF THE DRAWINGS

FIG. 3 shows a block diagram of the functional components of a borehole receiver.

FIG. 4 shows a block diagram of the functional components of a surface control system.

DETAILED DESCRIPTION OF THE PREFERRED EMBODIMENT

Figure 1:
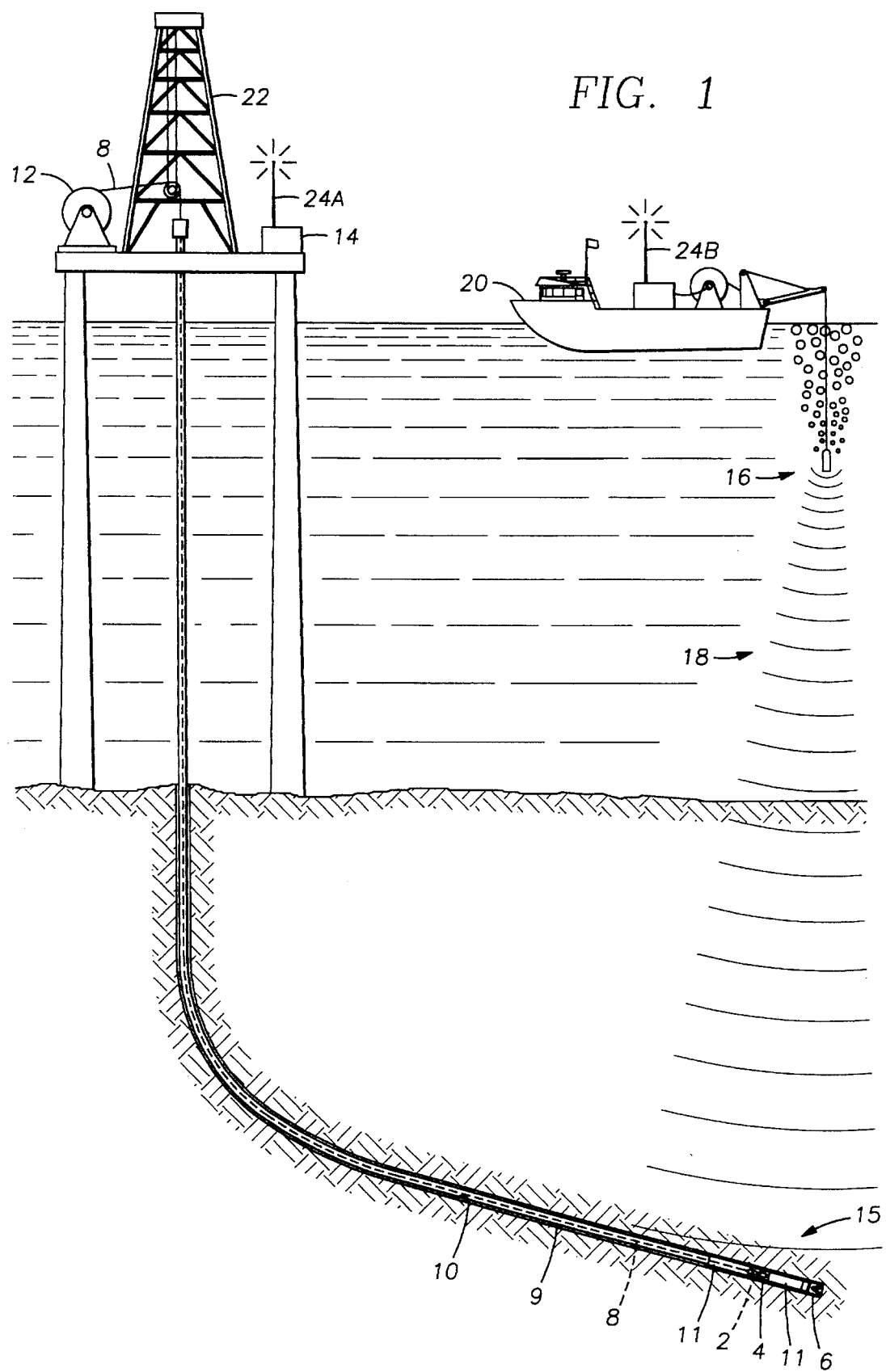
FIG. 1 shows the invention as typically used in a marine borehole geophysical survey, by deployment within a drillpipe by a slickline.

FIG. 1 shows the invention as it is typically used in a marine borehole geophysical survey. From a drilling platform, or rig 22, a borehole seismic receiver 2 is lowered into a drillpipe 9 in a wellbore 10 by means of a winch 12 which spools a single strand steel cable 8, known as slickline. Slickline 8 is typically used when servicing tools, which neither need surface supplied electrical power nor transmit signals to the surface by wire or cable, are conveyed into the wellbore 10. The winch 12 is typically referred to as a slickline unit. At the end of the drillpipe 9 is a bottom hole assembly 15, or BHA, comprising drill collars 11, a muleshoe sub 4, and a drill bit 6. The BHA 15 is normally used during the drilling of the wellbore 10. When a borehole seismic survey is recorded, the drilling process stops, but the drillpipe 9 and BHA 15 remain in the same configuration as during the active drilling of the wellbore 10.

The muleshoe sub 4 is typically included in the BHA 15 to provide a landing for directional surveying instruments such as magnetic multishots. The receiver 2 can land in the muleshoe sub 4, which reduces the possibility of inducing noise in the receiver as a result of movement of the receiver while a survey is being recorded.

A seismic energy source 16, which in this embodiment is an air gun array, is towed by a boat 20. The source 16 is positioned as closely as possible to vertically above the position in the earth of the receiver 2 in the wellbore 10. The source can be controlled by radio signals 24A and 24B when the invention is used to conduct a marine borehole geophysical survey. The radio signals 24A and 24B are generated by a surface control unit 14 located on the rig 22. In a land-based borehole geophysical survey, the source 16 can be directly connected to the surface control unit 14. When the source 16 is activated, seismic energy waves 18 travel through the earth to the receiver 2 where they are detected and recorded.

Figure 2:
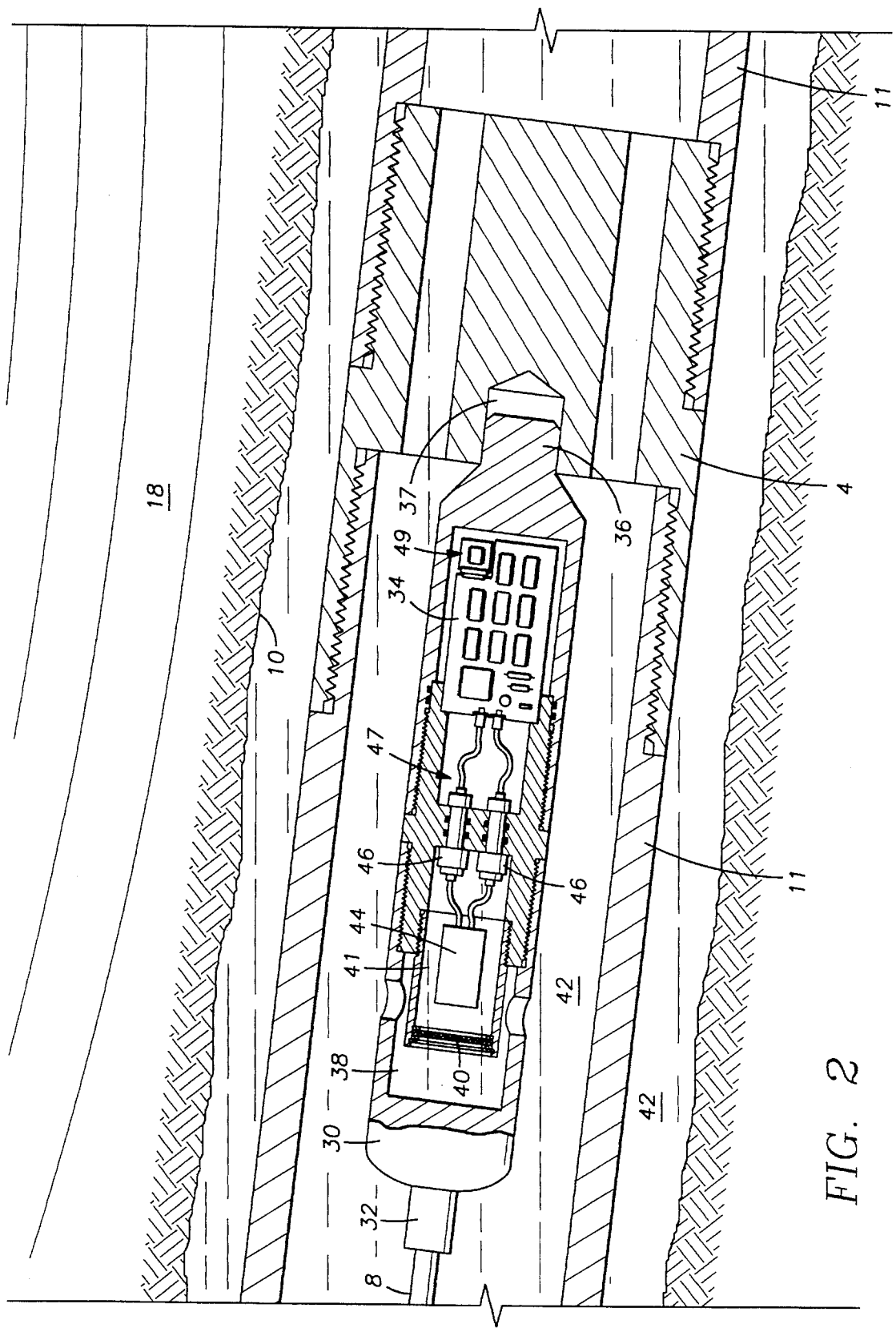
FIG. 2 shows in greater detail the components of the invention and the method of landing in the drillpipe.

The construction of the receiver 2 can be better understood by examining FIG. 2. The receiver 2 is enclosed in a housing 30 adapted to withstand the environment of the wellbore 10, which can have temperatures exceeding 350 degrees Fahrenheit and pressures exceeding 20,000 psi. The housing 30 is attached to the slickline 8 by a cable head 32 affixed to the top of the housing 30.

The housing 30 is lowered into the drill collars 11 until a key 36 at the bottom of the housing 30 lands in a matching slot 37 in the muleshoe sub 4. The slickline unit (shown as number 12 in FIG. 1) includes equipment for indicating to the operator that the receiver has landed in the muleshoe sub 4.

In the wall of the housing 30 is a chamber 38 in which is located an acoustic transducer 44, which in this embodiment is a piezoelectric hydrophone. The chamber 38 is in fluid communication with the interior of the drill collars 11. The transducer 44 is enclosed in a reservoir 41 which can be composed of a flexible elastomeric material. The reservoir is affixed to the housing 30 inside the chamber 38. The reservoir 41 is completely filled with a substantially non-compressible fluid such as hydraulic oil. The reservoir 41 is covered by a metal screen 40, which enables fluid communication with the drillpipe (shown as number 9 in FIG. 1), but protects the reservoir 41 from mechanically induced damage.

The housing 30 also comprises an enclosure 47 for a signal processing and recording system 34. The enclosure 47 is pressure sealed from the chamber 38 by feed through connectors 46 which make electrical connections from the recording system 34 to the transducer 44. A portion of the recording system 34 is contained inside a Dewar flask 49 located inside the enclosure. The flask 49 provides a substantially constant temperature to a portion of the recording system 34. Maintaining constant temperature to the portion of the recording system 34 is desirable for enabling a high degree of precision of timing of data recorded by the recording system 34.

The seismic energy waves 18 emitted by the source (shown as 16 in FIG. 1) travel through the earth until they contact the wall of the wellbore 10, whereupon the waves 18 are transmitted through a fluid 42 filling the drill collars 11 and the wellbore 10. The waves 18 passing through the fluid 42 behave as compressions and rarefactions of the fluid 42. The waves 18 finally travel through to the transducer 44 by means of alternately compressing and rarefying the fluid filling the reservoir 41. The transducer 44 converts the waves 18 into a time-varying electrical voltage which is conveyed through the feed through connectors 46 to the recording system 34.

FIG. 3 shows the functional components of the recording system (shown as number 34 in FIG. 2) located within the receiver (shown as number 2 in FIG. 1). The recording system 34 is electrically powered by a battery 62, which in this embodiment can be a lithium battery. The time varying electrical voltage generated by the transducer 44 as it converts the received seismic energy waves (shown as number 18 in FIG. 2) is conducted to an analog signal processor unit 52. The analog processor 52 provides amplification of the signal from the transducer 44, which in this embodiment has a gain factor of 1000 or 60 dB. The analog processor 52 also provides filtering to remove components of the signal which have a frequency above the maximum expected frequency content of the seismic energy waves 18. The amplified, filtered signal is then fed to a first analog to digital converter 54, or first ADC, which in this embodiment can be a Crystal Products Company model number CS5336. The first ADC 54 in this embodiment also has a signal processing function in which the analog input from the analog processor 52 is significantly oversampled. Oversampling enables use of analog filtering on the analog processor 52 with significantly less severe "roll-off", or decrease in output amplitude with frequency, than would otherwise be required to prevent "aliasing" of the signal. The signal is converted by the first ADC 54 into a series of binary numbers, also called a digitized signal. The operation of the first ADC 54 is timed by a first timer-controller 61 which in this embodiment can be an Intel Corp. model number EB186 processor. The first timer-controller 61 is programmed to activate the first ADC 54 only at predetermined time intervals corresponding to the time of activation of the seismic energy source (shown as number 16 in FIG. 1), commencing after a predetermined time delay to enable the receiver 2 to reach the deployment depth in the wellbore 10 without making unnecessary recordings. The time delay can be selectable by the operator. Time information is provided to the first timer-controller 61 by a first clock 60, which in this embodiment can be a Piezoelectric Corp. model number 692004. After the first ADC 54 converts a signal from the transducer 44 into a digitized signal, a digital signal processor 56, or DSP, digitally filters the signal and routes the digitized signal into a digital memory 58. The DSP 56 also measures the average amplitude of the signal level of an individual digitized signal. If the average amplitude of the signal exceeds a predetermined fraction, which in this embodiment is 50 percent, of the full-scale amplitude capacity of the first ADC 54, the digitized signal is rejected and is not transferred to the memory 58. Rejection of excessive average amplitude signals reduces the possibility that signals corrupted by noise from motion of the receiver 2 will be recorded. The value of 50 percent of full-scale was selected as an arbitrary initial value. Extended field experience may enable refinement of the value of 50 percent.

At the time the digitized signal is transferred to the memory 58, the time of recording of the specific digitized signal is also transmitted from the first timer-controller 61 to the memory 58.

The first clock 60 is housed in the flask (shown as 49 in FIG. 2). The flask 49 maintains a substantially constant temperature around the first clock 60 during the survey, because the first clock 60 can change frequency to some degree with temperature change. Maintaining substantially constant temperature at the first clock 60 increases the accuracy of the timing data stored in the memory 58 and operating the first timer-controller 61.

Digitized signals with their associated time information which are stored in the memory 58, can be later accessed through a communications port 64A. After a survey is recorded, the receiver 2 is brought to the earth's surface and the communications port 64A is connected to the surface control unit (shown as 14 in FIG. 1) by a cable (not shown).

FIG. 4 shows the functional components of the surface control unit (shown as 14 in FIG. 1). A second clock 68, which can be the same type as the first clock (shown as 60 in FIG. 3), provides timing information to a second timer-controller 71. The second timer-controller 71 can be the same type as the first timer-controller 61. The second timer-controller 71 transmits control signals to a source controller 66, at time intervals programmed to match the time intervals in which the first timer controller (shown as 61 in FIG. 3) is programmed to activate the ADC (shown as 54 in FIG. 3) in the receiver 2. The source controller 66 activates the seismic energy source 16 at predetermined intervals during the survey. The source controller 66 can be directly connected to the source 16, or can transmit activating signals by radio signal (shown as 24A and 24B in FIG. 1). The synchronization of the first ADC 54 operation with the source controller 66 operation both conserves battery (shown as 62 in FIG. 3) power in the receiver 2 and minimizes the amount of data stored in the memory (shown as 58 in FIG. 3) in the receiver 2.

A near-field sensor 73, which in this embodiment is a hydrophone positioned within one-half wavelength of the energy from the source 16, or about 25 feet, is used to record the acoustic signature of the energy of the source 16. The near-field sensor 73 output is routed to a second ADC 70, which can be the same type as the first ADC 54. The second ADC 70 is timed to digitize the sensor 73 output on receipt of command signals from the second timer-controller 71, which are timed at substantially the same time intervals as the first timer-controller 61 is programmed to activate the first ADC 54. The output from the second ADC 70 is routed to a computer 74, which in this embodiment can be a workstation such as a SUN Microsystems Corp. model SPARC 10, for later processing.

A communications bus 64B forms part of the second timer-controller 71. The bus 64B is connected to the communications port (64A in FIG. 3) in the receiver 2 by the cable (not shown) prior to the first survey being run, and again when the receiver 2 is brought to the surface at the conclusion of a survey. Data are transferred from the memory 58 in the receiver 2 by the port 64A to the bus 64B, whereupon the data are transferred to the computer 74 for later processing.

The other purpose for connecting the bus 64B to the port 64A is for the synchronization of the first clock (60 in FIG. 3) and the second clock 68. Timing data associated with digitized signals recorded in the receiver 2 must be related accurately to the time of activation of the source 16 in order to determine the travel time of the energy waves (shown as 18 in FIG. 1) from the source 16 to the receiver 2. Synchronization of the first clock 60 and the second clock 68 before the receiver 2 is run in the wellbore 10, and subsequent comparison of the time measured by the first clock 60 and the second clock 68 after the survey is completed to adjust for any time drift between the first clock 60 and the second clock 68, enables precise determination of the time of recording of signals in the receiver 2 relative to activation of the source 16. By determining the precise time of events recorded by the receiver 2 and comparing the time to the timing of activation of the source 16, the travel time of the seismic energy waves 18 from the earth's surface to the receiver 2 in the wellbore 10 can be determined.

Data read from the memory 58 when the receiver 2 is brought to the surface are routed from the bus 64B to the computer 74 for processing with the recordings of the source 16 acoustic signature made during the survey. The recordings can be processed by methods known in the art. For example a VSP survey processing program such as one used by Atlas Wireline Services under the trade name SEISLINK-X, can form part of the programming of the computer 74 to enable processing of the survey records from the receiver 2 into a VSP survey.

DESCRIPTION OF ALTERNATIVE EMBODIMENTS

Figure 5:
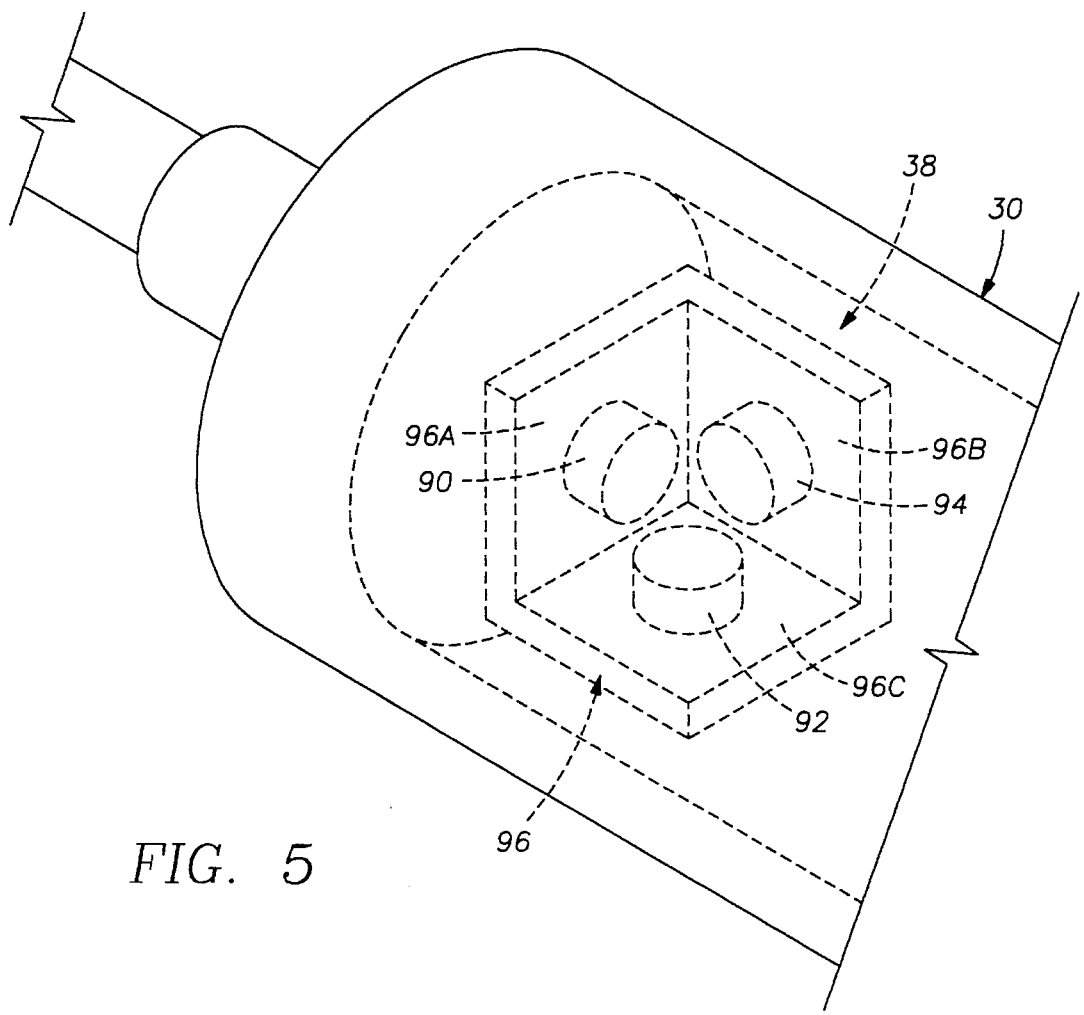
FIG. 5 shows an alternative embodiment of the receiver comprising accelerometer sensors.

Referring now to FIG. 5, a different type of transducer can be examined. The chamber 38 in the housing 30, which in the first embodiment was open to the wellbore 10, in the second embodiment is enclosed and pressure sealed as is the rest of the interior of the housing 30. A frame 96 comprising three flat surfaces 96A, 96B, 96C which are orthogonal to each other, is rigidly mounted inside the chamber 38. An accelerometer 90, 92, and 94, for each of the three orthogonal axes, with one axis parallel to the longitudinal axis of the housing 30, is mounted on each of the flat surfaces 96A, 96B, 96C on the frame 96. The accelerometers 90, 92, 94 respond to change in velocity of the housing 30 along the axis aligned with each accelerometer 90, 92, 94. Signal processing is substantially the same as in the first embodiment, with the exception that there must be a separate signal channel in the recording system 34 for each accelerometer 90, 92, 94.

Figure 6:
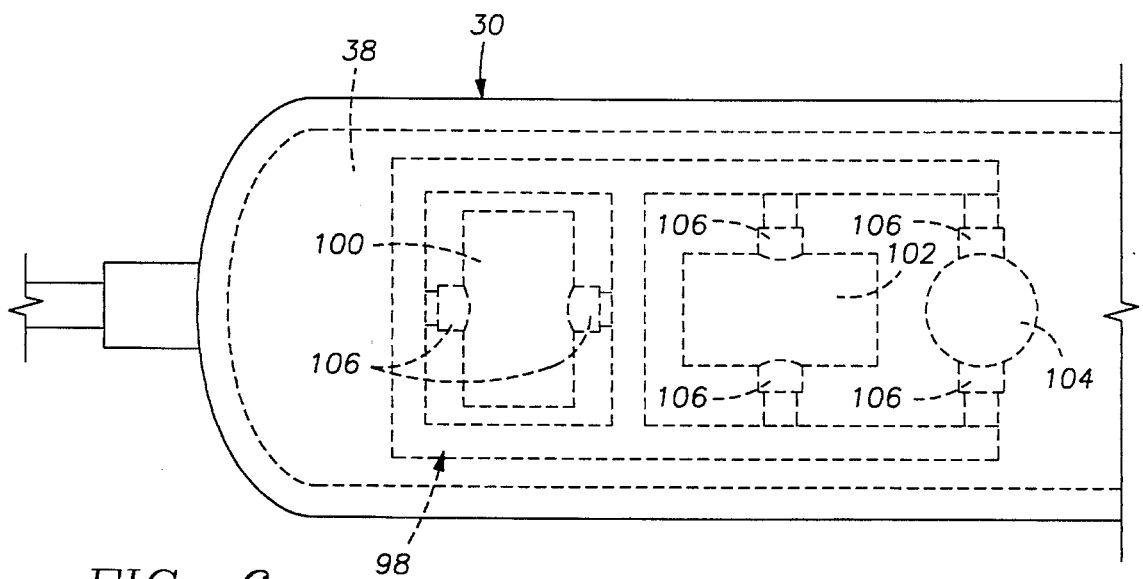
FIG. 6 shows an alternative embodiment of the receiver comprising geophone sensors.

FIG. 6 shows an alternative embodiment using three geophones 100, 102, 104, mounted on gimballed bearings 106 attached to a frame 98. The gimballed bearings 106, enable the geophones 100, 102,104, to orient by gravity, enabling the geophones 100, 102,104 to remain in alignment with the propagation direction of the seismic energy waves 18. The frame 98 is rigidly mounted inside the housing 30. As in the second embodiment, the recording system 34 must have one signal channel for each geophone 100, 102, 104.

I claim:

1. An apparatus for recording a geophysical survey in a wellbore penetrating an earth formation, said apparatus comprising:

a seismic receiver, adapted for traversing said wellbore, and comprising at least one transducer, a power source and a signal processing and recording unit, said at least one transducer, said power source and said signal processing and recording unit disposed within said receiver, said signal processing and recording unit programmed to generate a recording of an electrical signal generated by said at least one transducer as a result of detecting seismic energy;

a surface control unit, connected to a seismic energy source, said surface control unit synchronized with said signal processing and recording unit to activate said seismic energy source at predetermined time intervals corresponding to time intervals at which said signal processing and recording unit generates said recording, said surface control unit adapted to record an acoustic signature of said seismic energy source; and wherein said signal processing and recording unit comprises an analog signal processor connected to said at least one transducer said processor including an amplifier and a filter, a first analog-to-digital converter connected to said analog signal processor, a digital signal processor connected to said first analog-to-digital converter, a first timer-controller connected to said analog to digital converter, said first timer-controller programmed to activate said first analog-to-digital converter at predetermined time intervals corresponding to the predetermined time intervals at which said seismic energy source is activated, a first clock connected to said first timer-controller, a digital memory connected to said digital signal processor and to said first timer-controller, and a communications port connected to said first digital signal processor wherein said recording is transferred from said digital memory to said surface control unit and wherein said signal processing and recording unit is synchronized to said surface control unit.

2. The apparatus as defined in claim 1 wherein said surface control unit further comprises:

a source controller connected to said seismic energy source;

a second timer-controller, connected to said source controller, said timer-controller programmed to activate said source controller at predetermined time intervals;

a second clock, connected to said second timer-controller;

a communications bus, connected to said second timer-controller;

a near-field sensor;

a second analog-to-digital converter, connected to said near-field sensor for digitizing said acoustic signature; and a computer, connected to said second timer-controller and to said second analog-to-digital converter, wherein said recording is downloaded into said computer through said communications bus and said recording is correlated to said acoustic signature of said seismic energy source measured by said near-field sensor.

3. The apparatus as defined in claim 1 wherein said seismic energy source comprises an air gun array.

4. The apparatus as defined in claim 1 wherein said seismic energy source comprises dynamite.

5. The apparatus as defined in claim 1 wherein said seismic energy source comprises a vibrator unit.

6. The apparatus as defined in claim 1 wherein said at least one transducer comprises a hydrophone pressure detector.

7. The apparatus as defined in claim 1 wherein said at least one transducer comprises a geophone.

8. The apparatus as defined in claim 1 wherein said at least one transducer comprises an accelerometer.

9. The apparatus as defined in claim 2 wherein said near-field sensor comprises a hydrophone pressure detector.

10. The apparatus as defined in claim 2 wherein said near-field sensor comprises at least one accelerometer.

11. The apparatus as defined in claim 2 wherein said near-field sensor comprises at least one geophone.

* * * * *